(12) United States Patent
Kuth et al.

(10) Patent No.: US 6,711,738 B1
(45) Date of Patent: Mar. 23, 2004

(54) METHOD FOR REPLACING TECHNOLOGICALLY AGING SUB-SYSTEMS IN A SYSTEM

(75) Inventors: Rainer Kuth, Herzogenaurach (DE); Christian Wolf, Heroldsbach (DE); Robert Hebel, Erlangen (DE); Arkadiusz Polacin, Erlangen (DE); Manfred Herbert, Erlangen-Buechenbach (DE); Friedo Muehlenstedt, Nuremberg (DE); Martin Bauer, Nuremberg (DE); Nikolaus Bolle, Issaquah, WA (US); Markus Lusser, Bubenreuth (DE)

(73) Assignee: Siemens Aktiengesellschaft, München (DE)

( * ) Notice: Subject to any disclaimer, the term of this patent is extended or adjusted under 35 U.S.C. 154(b) by 395 days.

(21) Appl. No.: 09/723,081

(22) Filed: Nov. 27, 2000

(51) Int. Cl.$^7$ .................................................. G06F 9/44
(52) U.S. Cl. ...................................................... 717/173
(58) Field of Search ................................ 717/168–178; 709/310; 707/200–205

(56) References Cited

U.S. PATENT DOCUMENTS

| | | | | |
|---|---|---|---|---|
| 6,023,727 A | * | 2/2000 | Barrett et al. | 709/221 |
| 6,052,720 A | * | 4/2000 | Traversat et al. | 709/220 |
| 6,240,494 B1 | * | 5/2001 | Nagasawa et al. | 711/165 |
| 6,295,423 B1 | * | 9/2001 | Haines et al. | 399/24 |
| 6,301,612 B1 | * | 10/2001 | Selitrennikoff et al. | 709/220 |
| 6,462,363 B1 | * | 10/2002 | Denham | 257/209 |
| 6,542,981 B1 | * | 4/2003 | Zaidi et al. | 712/2 |

* cited by examiner

Primary Examiner—John Chavis
Assistant Examiner—Lawrence J Shrader
(74) Attorney, Agent, or Firm—Schiff Hardin LLP

(57) ABSTRACT

In a method for replacing technologically aging sub-systems and software in a system of which the sub-systems are components, a data bank is maintained by a service provider for each customer. In the data bank, the sub-system currently installed at the customer is indicated. Before replacing a part of a sub-system, the data bank is interrogated to determine whether, dependent on the age class of the sub-system, the entire sub-system should be replaced. If so, replacement of the entire sub-system is undertaken, and the data bank is updated. Similarly, before upgrading software for a customer's sub-system, the data bank is interrogated to determine whether replacement of the sub-system is required, given the age class of the sub-system. If so, the sub-system is replaced and software appropriate for the replaced sub-system is then installed.

2 Claims, 3 Drawing Sheets

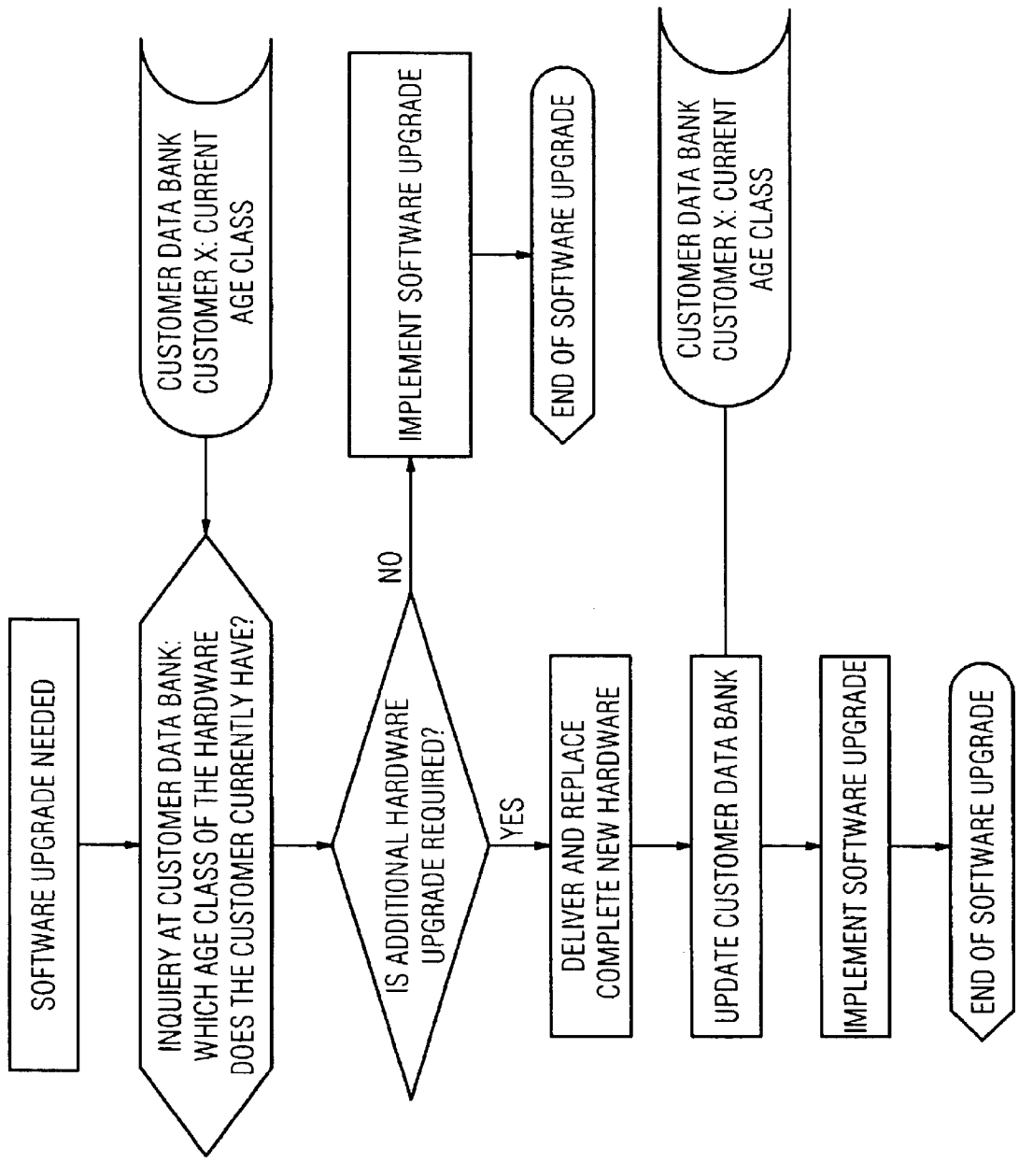

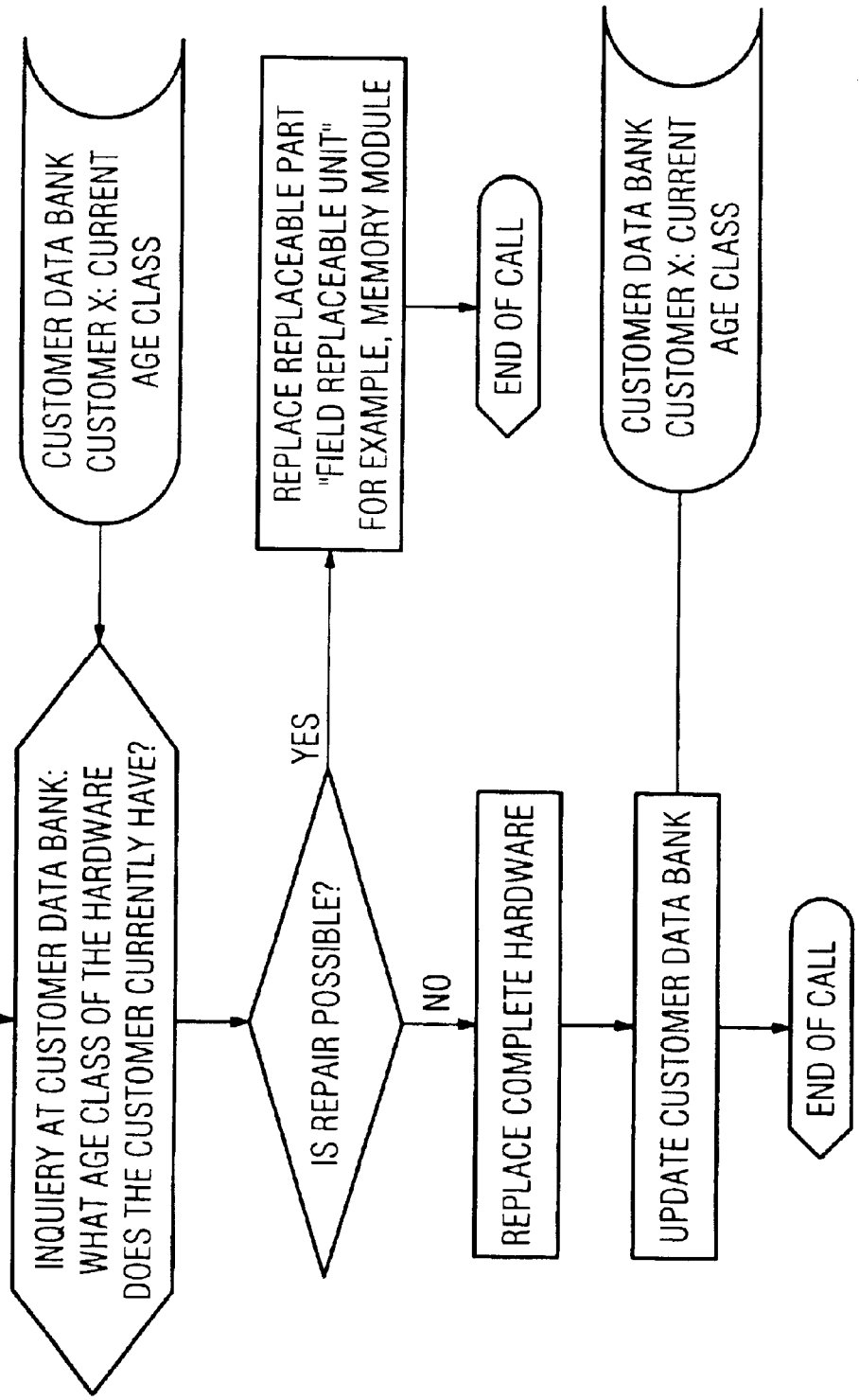

METHOD FOR REPLACING TECHNOLOGICALLY AGING SUB-SYSTEMS IN A SYSTEM

BACKGROUND OF THE INVENTION

1. Field of the Invention

The present invention is directed to a method for replacing sub-systems which are components of larger systems, wherein the sub-systems are subject to technological aging, i.e., the sub-systems become outdated.

2. Description of the Prior Art

Many large systems employ a number of sub-systems as components of the system, and the sub-systems are subject to relatively rapid technological aging, i.e., the sub-systems become outdated in terms of technology much more quickly than the overall system. This means that one or more sub-systems will almost always have to be replaced before the overall system becomes obsolete and is itself in need of replacement. In the case of personal computers which form a sub-system of a larger system, the rapid advances in computer technology and software updates make it certain that the personal computer which is present in the system at the time of installation will have to be replaced, probably several times, during the life of the system.

In the case of a medical imaging system, such as a computed tomography apparatus or a magnetic resonance imaging apparatus, for example, the overall life of the system may be approximately ten years, whereas the operating computer in such a system will have a typical technological service life of, for example, three years. This technological service life for the personal computer is established by the time during which individual replacement parts are available, as well as by the duration of the acceptable performance of the computer. When either replacement parts are not available, or it is determined that the computer's performance is so far below current standards as to present a drag or burden to the system, replacement of the computer is necessary. Of course, if a malfunction occurs at or before this time, replacement is also necessary.

Many customers, however, are resistant to continually replacing or updating computers which are integrated into a larger system. In order to accommodate these desires on the part of many customers, manufacturers, or those responsible for fulfilling maintenance and service contracts, must maintain a relatively large inventory of replacement parts available. With regard to software upgrades, many customers are reluctant to pay the additional cost associated with a software upgrade and, moreover, it must be ensured that the upgraded software still allows proper functioning when installed in a computer which is a subsystem of an older system.

SUMMARY OF THE INVENTION

It is an object of the present invention to provide a method for replacing technologically aging sub-systems in a system which allows customers with a maintenance agreement to have a system with a defined technological age and which allows customers who do not have a maintenance agreement to incur costs in the event of a malfunction of a sub-system that were predictable in advance.

This object is inventively achieved in a method wherein sub-systems that rapidly age in terms of technology are divided into a finite number of age levels. An upgrade path is defined and applied for each age level.

In the inventive method, a central customer databank is maintained in which age classes of the sub-systems for a number of different customers are maintained. For each sub-system and for each customer, such age classes are maintained in the databank both for hardware and software. Before repair or replacement of a hardware component, the databank is interrogated to determine whether, for the sub-system in question and the customer in question, a complete hardware (sub-system) replacement is appropriate, given the age class of the sub-system currently installed at the customer. If a complete sub-system replacement with the newest sub-system generation is determined to be appropriate and is thus undertaken, the customer databank is updated to indicate the new sub-system generation which is now installed at the customer. Similarly, before a software upgrade is undertaken for a particular customer, the databank is interrogated to determine whether a complete hardware replacement for the sub-system in question, given age class of the sub-system and the software, is appropriate, and if so the hardware and the software at the customer are updated and the customer databank is also updated to indicate the sub-system newest generation software that are now installed at the customer.

In dividing the hardware of the sub-system into age classes all sub-systems which are based on the same technology characterized, for example, by the same type of memory chip, same type of processor, same level of integrated circuit design, etc., are classified in the same age class.

DESCRIPTION OF THE DRAWINGS

FIG. 2 is a flow chart of a first embodiment of the inventive method for replacing software.

FIG. 3 is a flow chart of a second embodiment of the inventive method for replacing hardware.

DESCRIPTION OF THE PREFERRED EMBODIMENTS

Figure 1:
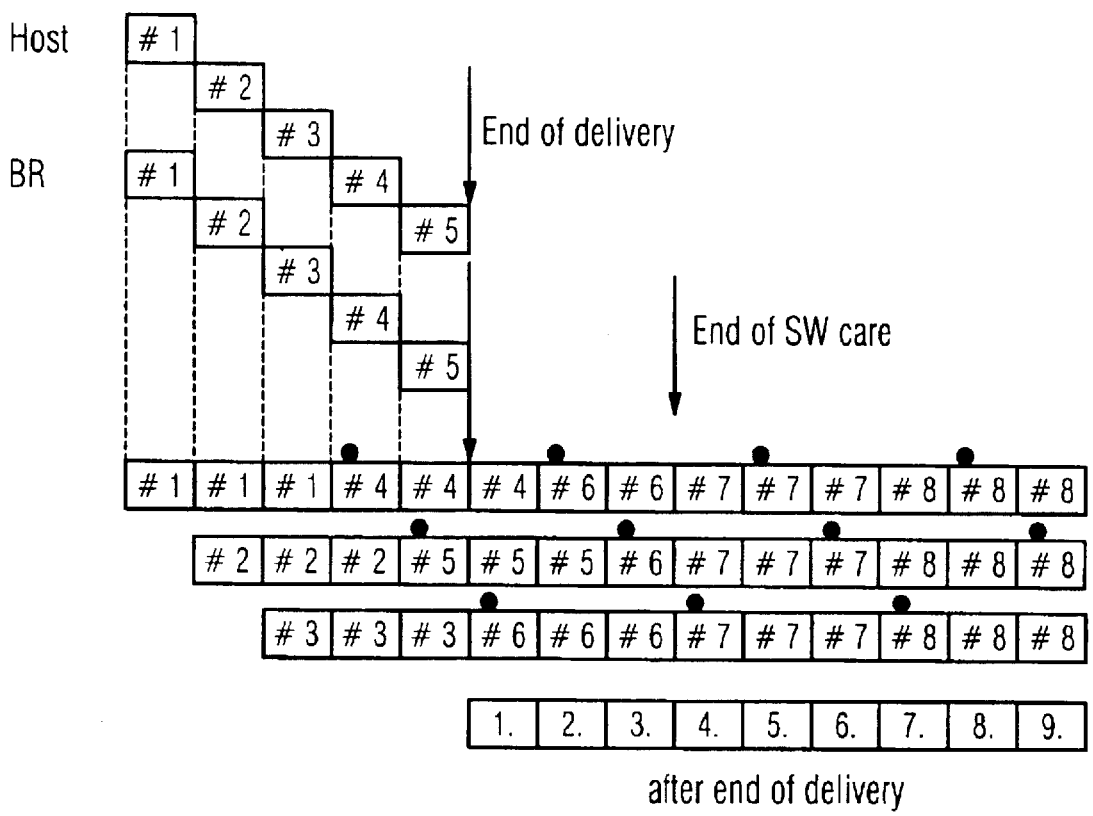
FIG. 1 is an illustration in the form of a timed sequence of events for replacing sub-system hardware and/or software in accordance with the inventive method.

In accordance with the inventive method, a data bank is maintained by, for example, a company that is responsible for fulfilling service contracts or maintenance contracts for large systems, such as medical imaging systems, which contain subsystems that are subject to technological aging. The sub-systems that are respectively installed at each customer are entered into the data bank in age classes, both with regard to hardware and software. For a hardware component, an age class can be defined as encompassing all personal computers, for example, having the same type of memory technology, the same type of processor, the same level of integrated circuit design, etc. Software can be characterized as to age level by updates (versions) generated by the manufacturer of the software.

FIG. 1 shows an example of a large system that is maintained for a customer over time span of five years. Software upgrades are only supplied for two or three years after the installation.

In this example, the rapidly aging sub-system is assumed to be a personal computer. This personal computer is replaced annually by a successor computer during the five years of the service life of the system, with the currently available computer model succeeding its predecessor each year. This is indicated by the steps 1, 2, 3 etc., which represent the computer generation for a particular year.

The sequence labeled BR symbolizes repair. When a customer's computer fails, it is replaced by the model that is current for that time, i.e. it is replaced by model 1 in the first year, by model 2 in the second year, etc.

FIG. 1 also includes three horizontal lines. The top horizontal line indicates the employment of personal computer generations in systems that were delivered in the first year, in which the originally-supplied personal computer remains in the system for three years (unless a malfunction occurs). In the fourth year, this personal computer will be replaced by a completely new computer of the fourth generation. The dot shown at that time in FIG. 1 represents the first "evolve upgrade." The next evolve upgrade is due after another three years, etc.

The middle horizontal line represents a system that was delivered to the customer in the second year after the market introduction. Upon installation, the customer is supplied with a computer of the second generation, and keeps this second generation computer for three years, and then receives an evolve upgrade to the fifth generation in the fourth year after purchasing the system.

Three years after the end of the delivery, all systems have been converted to the same, new computer generation, as indicated by the bottom horizontal line, so that the same computer configuration is present in all systems with respect to software updates that are subsequently required, and only one software version therefor must be taken into consideration before delivery thereof.

FIG. 2 is a flow chart for a software replacement in accordance with the inventive method. A determination is first made as to whether a software upgrade is needed, and an inquiry is made to the customer data bank to determine the age class of the hardware that the customer currently has. A determination is then made as to whether an additional hardware upgrade is required. If no hardware upgrade is required, a software upgrade is then implemented. If, however, it is determined that a hardware upgrade is required, then new hardware is delivered and replaced and the customer data bank is updated. A software upgrade is then undertaken in the newly delivered hardware.

Another embodiment of the invention is shown in FIG. 3, which begins with a service call due to a notification that a malfunction at a customer system has occurred. An inquiry is then made to the customer data bank to determine the age class of the hardware that the customer currently has, and a determination is made as to whether repair of the hardware is possible. If repair is possible, a replaceable part of the hardware is replaced with a "field replaceable unit," for example a memory module. If repair is not possible, the complete hardware (sub-system) is replaced and the Although modifications and changes may be suggested by those skilled in the art, it is the intention of the inventors to embody within the patent warranted hereon all changes and modifications as reasonably and properly come within the scope of their contributions to the art.

We claim as our invention:

1. A method for replacing technologically aging sub-systems in a system, comprising the steps of:

maintaining a central customer databank for customers of a party responsible for servicing systems respectively owned by said customers, each of said systems containing at least one sub-system using technologically aging hardware and using technologically aging software;

in said databank, for each customer, classifying said sub-system in an age class dependent on an age of said hardware and said software;

before repairing said hardware of a sub-system for a customer, interrogating said databank to determine, dependent on the age class of the sub-system for said customer, whether a complete sub-system replacement is required;

if interrogation of said databank indicates a complete sub-system replacement is required, completely replacing the sub-system for said customer and updating said databank entry for that customer to indicate replacement of the sub-system;

before upgrading said software of a sub-system for a customer, interrogating said databank to determine whether a complete sub-system replacement for that customer is required dependent on the age class of the sub-system; and if interrogation of said databank indicates that a complete replacement of the sub-system is required, replacing said sub-system and upgrading software for the replacement sub-system to a latest generation, and updating said databank to indicate the replacement sub-system and the upgraded software.

2. A method as claimed in claim 1 comprising classifying said sub-systems in respective age groups dependent on a criterion selected from the group consisting of memory type, processor type and level of integrated circuit.

* * * * *